May 17, 1960  S. WILDER, JR  2,937,042
SHAFT COUPLING
Filed Oct. 2, 1958

INVENTOR.
STUART WILDER, JR.
BY
Harold B. Hood
ATTORNEY

United States Patent Office

2,937,042
SHAFT COUPLING

Stuart Wilder, Jr., Columbus, Ind., assignor to The Reliance Electric and Engineering Company, Euclid, Ohio, a corporation of Ohio Application October 2, 1958, Serial No. 764,903

5 Claims. (Cl. 287—126)

The present invention relates to a shaft coupling.

It is frequently necessary to provide an operative connection between the input shaft of a mechanical apparatus and the output shaft of a driver means for the purpose of supplying driving power to the mechanical apparatus. In some cases this is done through the medium of a male-female joint including a key which prevents relative rotation of the connected shafts. In certain applications where there is frequent speed changing and reversing of the shafts and where there are forces acting upon the shafts tending to misalign the shafts and to work them at their junction point, there is, in conventional couplings, a large amount of fretting corrosion both in the key itself and in the shaft end which forms the male member of the coupling. In one application involving the driving of a worm gear reducer by means of a variable speed pulley, the metal end of the male member shaft has been found to fret badly and the metal key of the coupling to be lost in red dust after only about 8,000 hours of operation.

It is therefore an object of the present invention to provide a shaft coupling having improved corrosion characteristics.

It is a further object of the present invention to provide a shaft coupling having improved ability to resist the wear caused by frequent speed changing and reversing.

Still another object of the present invention is to provide a shaft coupling having improved ability to resist the wear caused by forces acting upon the shafts tending to misalign the shafts and to work them at their junction point.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
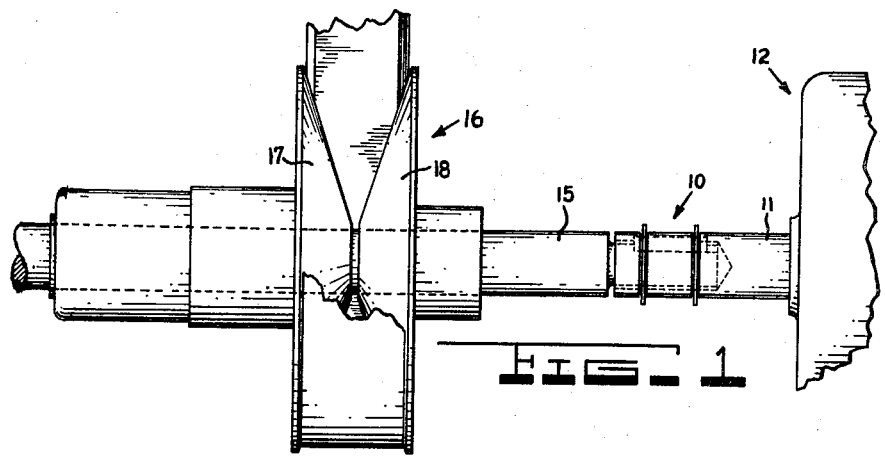
Fig. 1 is a fragmentary side view of a variable speed pulley and a worm gear reducer operatively connected to one another by means of a shaft coupling embodying the present invention.
Figure 2:
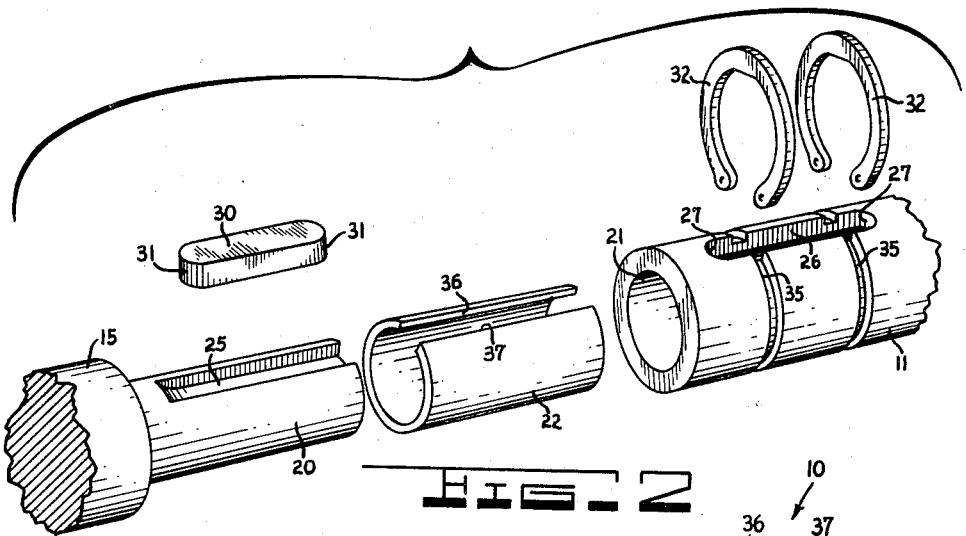
Fig. 2 is an enlarged, exploded, perspective view of the coupling of Fig. 1 showing the elements of the coupling in detail.
Figure 3:
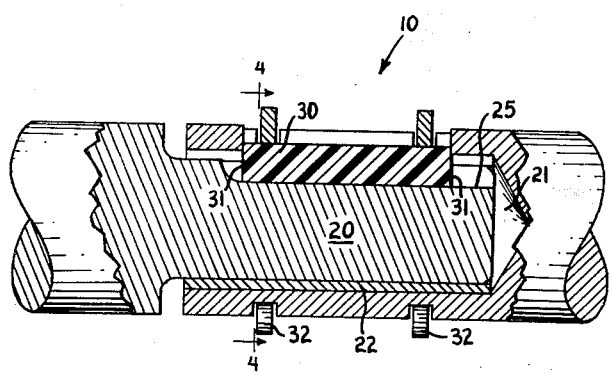
Fig. 3 is a longitudinal section of the coupling of Figs. 1 and 2 showing the coupling in an assembled condition.
Figure 4:
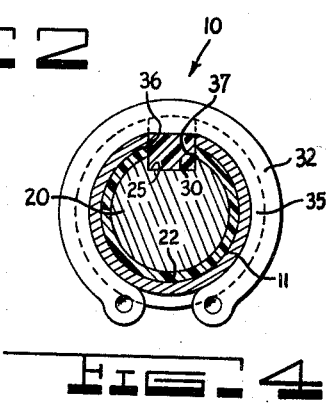
Fig. 4 is a transverse section taken in the direction of the arrows and along the line 4—4 of Fig. 3.

Referring now to the drawings, I have illustrated a shaft coupling 10 constructed according to the principles of my invention and connecting the input shaft 11 of a gear reducer 12 and the output shaft 15 of a variable speed pulley 16, one disc 17 of which is axially movable relative to the other disc 18 of the pulley 16. The shaft coupling 10 comprises a reduced diameter, constant diameter end portion 20 on the shaft 15 which is received within a socket 21 formed coaxially of the shaft 11 in the end of the shaft 11, the shafts 11 and 15 being arranged substantially axially of one another, any variations from a directly axial arrangement being caused by forces involved in the operation of the coupling to transmit a rotary drive or through slight misalignments in assembly. The end portion 20 and the socket 21 are of such external and internal diameters, respectively, that a strip 22 of nylon, which is curled into a part-cylindrical form and inserted into the socket 21 surrounding the end portion 20 so as to form a sleeve, provides a snug fit connection between the shafts 11 and 15, the strip 22 having a suitable thickness for this purpose.

The end portion 20 of the shaft 15 is provided with an elongated keyway 25 which extends from the distal end of the reduced diameter end portion 20 axially of the shaft 15 and of the end portion 20. The shaft 11 has, at its socketed end, an elongated slot 26 which has rounded ends 27—27 and which extends from the socket 21 to open externally of the shaft 15. The shafts 11 and 15 are so arranged that the keyway 25 and the elongated slot 26 are aligned or are in registry for the reception of a nylon key 30 having rounded ends 31—31, the nylon strip 22 being of such dimensions as to provide, between its edges 36 and 37, sufficient space for said key. Preferably, when the parts are in assembled condition, the strip edges 36 and 37 will lie in contact with the lateral surfaces of the key, as shown. The key 30, which prevents relative rotation of shafts 11 and 15, is held against the bottom of the keyway 25 and within the slot 26 and keyway 25 by means of a pair of resilient snap rings 32—32 which are received within a pair of peripheral indentations or grooves 35—35 extending around the external surface of the shaft 11 and intersecting the slot 26.

In the operation of such a shaft coupling as above described for relatively long periods of time and under conditions involving sudden speed changes, reversals and driving of heavy machinery of high momentum and under conditions in which there are forces acting upon the shafts tending to misalign the shafts and to work them at their junction point, relatively little or no wear of the various elements of the coupling has resulted. Although I presently believe that a nylon key in combination with the nylon sleeve above described will give the greatest reduction in wear in a shaft coupling, it is also believed that because of the relatively soft cushiony nature of nylon and because of its capacity for resilient distortion to a slight degree, the use of a nylon key alone without the nylon sleeve will result in some improvement and will reduce a certain amount of the damage resulting from frequent speed changes and driving of heavy machinery of high momentum. Furthermore, because of the properties of nylon, it is also believed that the use of a nylon sleeve alone without the nylon key will reduce a certain amount of the wear resulting from operating under conditions in which there are forces acting upon the shafts tending to misalign the shafts and to work them at their junction point.

I claim as my invention:

1. A shaft coupling for use in an environment in which the elements thereof are subjected to fretting corrosion forces, said coupling comprising a first shaft having a socket in one end thereof, a second shaft arranged substantially axially of said first shaft with one end received in said socket, said second shaft having a keyway therein adjacent the one end thereof, said first shaft being provided with an aperture in its side wall opening into said said socket, said first and second shafts being so arranged that said keyway and aperture are in registry, a nylon sleeve received within said socket surrounding said second shaft, and a nylon key received in said keyway and aperture and preventing relative rotation of said shafts.

2. A shaft coupling for use in an environment in which the elements thereof are subjected to fretting corrosion forces, said coupling comprising a first shaft having a socket in one end thereof, a second shaft arranged substantially axially of said first shaft with one end received in said socket, said second shaft having an elongated keyway therein extending axially thereof adjacent the one end thereof, said first shaft having an elongated slot axially thereof opening into said socket, said slot having rounded ends, said first and second shafts being so arranged that said keyway and slot are in registry, a nylon sleeve received within said socket surrounding said second shaft, an elongated, round-ended nylon key received in said keyway and slot and preventing relative rotation of said shafts, and means carried by said first shaft for holding said nylon key in said keyway and slot.

3. A shaft coupling comprising a first shaft having a socket in one end thereof, a second shaft arranged substantially axially of said first shaft and having a reduced diameter end portion received in said socket, said second shaft having an elongated keyway extending from the distal end of said reduced diameter end portion of said second shaft axially thereof, said first shaft having a round-ended elongated slot in the side wall thereof opening into said socket and arranged axially of said first shaft, said first and second shafts being so arranged that said keyway and slot are in registry, an elongated, round-ended nylon key received in said keyway and slot and preventing relative rotation of said shafts, a strip of nylon curled into a part-cylindrical form and received within said socket partially surrounding said reduced diameter end but providing sufficient space for said key, said strip of nylon being of such a thickness as to provide a snug fit connection between said first and second shafts, said first shaft having at least one peripheral indentation intersecting said slot, and a snap ring received in each peripheral indentation for retaining said key in said keyway and slot.

4. A shaft coupling for use in an environment in which the elements thereof are subjected to fretting corrosion forces, said coupling comprising a first shaft and a second shaft, the adjacent ends of said shafts being telescopically associated and being formed with registering keyways, a nylon key received in said keyways, and a nylon sleeve snugly interposed between said telescopically-associated shaft ends.

5. A shaft coupling for use in an environment in which the elements thereof are subjected to fretting corrosion forces, said coupling comprising a first shaft and a second shaft, the adjacent ends of said shafts being telescopically associated and being formed with registering keyways, a nylon key received in said keyways, and a split nylon sleeve snugly interposed between said telescopically-associated shaft ends, the separated edges of said sleeve substantially engaging the respective lateral edges of said key.

References Cited in the file of this patent

UNITED STATES PATENTS

| | | |
|---|---|---|
| 1,009,729 | Ekeberg et al. | Nov. 28, 1911 |
| 1,836,348 | Wardell | Dec. 15, 1931 |
| 2,516,472 | MacKeage | July 25, 1950 |
| 2,607,956 | Brutus | Aug. 26, 1952 |
| 2,686,069 | Hastie | Aug. 10, 1954 |
| 2,801,530 | Holt | Aug. 6, 1957 |
| 2,852,056 | Rapata | Sept. 16, 1958 |